United States Patent
Etoh et al.

(10) Patent No.: US 9,230,573 B1
(45) Date of Patent: Jan. 5, 2016

(54) MAGNETIC RECORDING HEAD WITH NON-MAGNETIC BUMP STRUCTURE FORMED ON SPIN TORQUE OSCILLATOR

(71) Applicant: HGST Netherlands B.V., Amsterdam (NL)

(72) Inventors: Kimitoshi Etoh, Odawara (JP); Kenji Sugiura, Odawara (JP); Mikito Sugiyama, Odawara (JP); Yohji Maruyama, Iruma (JP); Kazuhiko Hosomi, Fujisawa (JP); Katsuro Watanabe, Hitachiota (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/602,160

(22) Filed: Jan. 21, 2015

(51) Int. Cl.
 *G11B 5/39* (2006.01)
(52) U.S. Cl.
 CPC .......................................... *G11B 5/39* (2013.01)
(58) Field of Classification Search
 CPC ........................................................ G11B 5/39
 USPC ...................................................... 360/125.3
 See application file for complete search history.

(56) References Cited

U.S. PATENT DOCUMENTS

| | | | |
|---|---|---|---|
| 7,982,996 B2 | 7/2011 | Smith et al. | |
| 8,347,489 B2 * | 1/2013 | Hong et al. | 29/603.16 |
| 8,477,453 B2 * | 7/2013 | Takano et al. | 360/125.14 |
| 8,547,662 B2 | 10/2013 | Yamada et al. | |
| 8,582,240 B1 | 11/2013 | Chen et al. | |
| 8,687,322 B1 | 4/2014 | Matsumoto et al. | |
| 8,797,686 B1 * | 8/2014 | Bai et al. | 360/125.15 |
| 8,837,088 B1 * | 9/2014 | Kimura et al. | 360/125.3 |
| 8,995,088 B1 * | 3/2015 | Boone et al. | 360/125.32 |
| 9,001,465 B1 * | 4/2015 | Shimizu et al. | 360/125.3 |
| 9,047,894 B2 * | 6/2015 | Chiu et al. | |
| 2014/0063648 A1 | 3/2014 | Shiroishi et al. | |
| 2014/0177100 A1 | 6/2014 | Sugiyama et al. | |

OTHER PUBLICATIONS

Watanabe et al., "Oscillation Stability of a Small Size Spin Torque Oscillator for MAMR," IEEE Transactions on Magnetics, vol. 49, No. 7, Jul. 2013, pp. 3628-3631.
Kudo, K., "Nonlinear Dynamics in Spin-Torque-Induced Magnetization Oscillation Phenomena," Thesis or Dissertation, Kyoto University, May 23, 2013 (abstract only).

* cited by examiner

*Primary Examiner* — Mark Blouin
(74) *Attorney, Agent, or Firm* — Zilka-Kotab, PC

(57) ABSTRACT

A magnetic write head having a write pole with a tapered trailing edge and a magnetic oscillator formed on the trailing edge of the write pole. The magnetic oscillator is sandwiched between the magnetic write pole and a trailing magnetic shield. The write head also includes a non-magnetic, electrically conductive bump structure located over a back portion of the magnetic oscillator between the magnetic oscillator and the trailing magnetic shield. The presence of the non-magnetic, electrically conductive bump structure causes electrons to properly flow through the magnetic oscillator in a direction that is generally perpendicular to the plane of the magnetic oscillator, even when the magnetic oscillator is formed on an inclined plane on the tapered trailing edge of the write pole. This thereby ensures optimal performance of the magnetic oscillator.

20 Claims, 16 Drawing Sheets

MAGNETIC RECORDING HEAD WITH NON-MAGNETIC BUMP STRUCTURE FORMED ON SPIN TORQUE OSCILLATOR

FIELD OF THE INVENTION

The present invention relates to magnetic data recording and more particularly to a magnetic write head having a spin torque oscillator formed on a write pole and a non-magnetic bump structure for improved electron flow through the spin torque oscillator.

BACKGROUND

The ever increasing need for digital data storage has driven an ever increasing demand for improved magnetic data storage systems, such as magnetic disk drive systems. The magnetic disk drive includes a rotating magnetic disk, write and read heads that are suspended by a suspension arm adjacent to a surface of the rotating magnetic disk and an actuator that swings the suspension arm to place the read and write heads over selected data tracks on the rotating disk. The read and write heads are located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then travels through a magnetically soft underlayer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

As magnetic bit sizes decrease in order to accommodate ever increasing data density demands, the ability to maintain a stable magnetic signal on a media becomes ever more challenging. The smaller magnetic bit size and smaller magnetic spacing makes the magnetic bits less stable, and prone to data loss. One way to overcome this challenge is to increase the magnetic coercivity and magnetic anisotropy of the magnetic recording layer of the magnetic media. However, this also makes the magnetic media harder to write to, requiring a high magnetic write field to record to the media. This challenge is further exacerbated by the reduced size of the write head that is needed to record the smaller bit. As the write head becomes smaller, the amount of write field that it can produce is also reduced. Therefore, there remains a need for a magnetic recording system that can effectively record a stable magnetic signal to a recording media at very high data densities.

SUMMARY

The present invention provides a magnetic write head having a magnetic write pole extending to a media facing surface and having a tapered trailing edge. A magnetic oscillator structure is formed on the tapered trailing edge of the magnetic write pole, and a non-magnetic, electrically conductive layer is formed on a portion of the magnetic oscillator that is removed from the media facing surface. A magnetic shield is then formed over the magnetic oscillator structure and the non-magnetic, electrically conductive layer.

The magnetic oscillator is formed at an inclined plane as a result of being formed on the tapered trailing edge of the write pole. This would tend to cause electrons flowing through the magnetic oscillator to also travel at an angle through the magnetic oscillator, leading to reduced non-optimal performance of the magnetic oscillator.

The presence of the non-magnetic, electrically conductive layer (or bump), however, advantageously prevents this by causing the electrons to flow in a direction that is generally perpendicular to the plane of the magnetic oscillator, thereby ensuring optimal magnetic performance of the magnetic oscillator.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
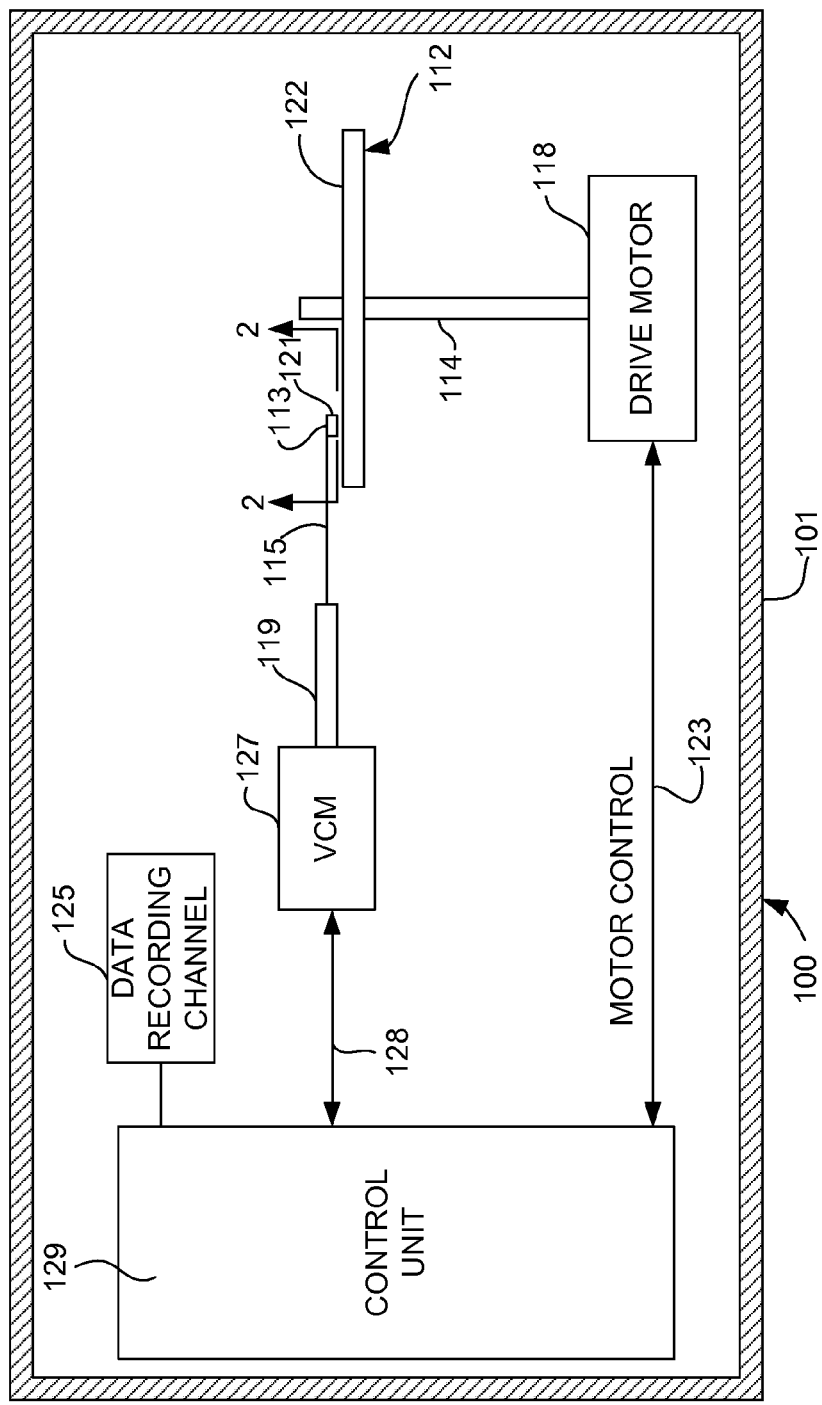
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. Typically, the magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the control unit 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage, means and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
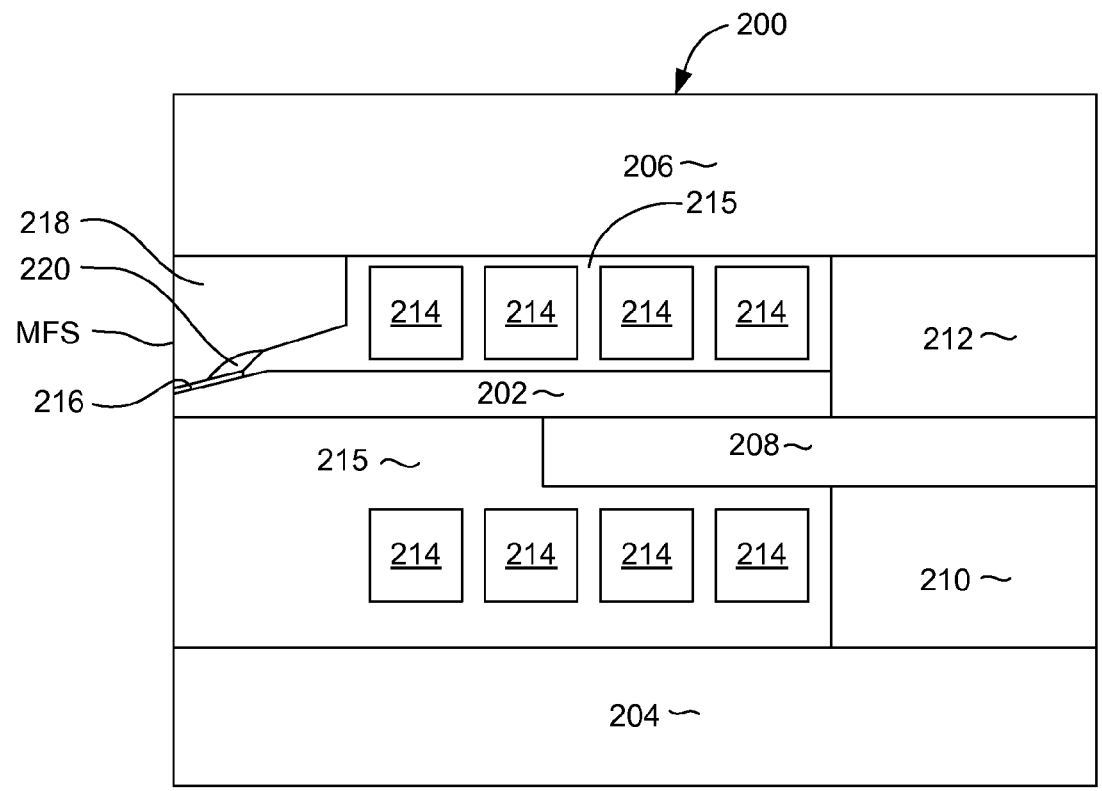
FIG. 2 is a side, cross sectional view of a magnetic write head according to an embodiment.

FIG. 2 shows a side cross sectional view of a magnetic write head 200 that could be formed on a magnetic head 121 of a slider 113 (FIG. 1). The magnetic write head 200 include a magnetic write pole 202 that extends to a media facing surface MFS, and can include a leading return pole 204 and a trailing return pole 206. The magnetic write pole 202 can be magnetically connected with a magnetic shaping layer 208, and the write pole 202 and shaping layer 208 can be connected with the return poles 204, 206 by magnetic back gap layers 210, 212 at a location removed from the media facing surface MFS.

A magnetic write coil structure 214, shown in cross section in FIG. 2 passes through the write head 200. As shown in FIG. 2, the write coil structure 214 can include upper and lower coils, formed of a non-magnetic, electrically conductive material such as Cu, that pass above and below the write pole 202. The write coil structure 214 can be embedded in a non-magnetic, electrically insulating material such as alumina 215.

When an electrical current flows through the write coil structure 214, a resulting magnetic field causes a magnetic flux to flow through the write coil 202, shaping layer 208, return poles 204, 206 and back gap structures 210, 212. This results in a magnetic write field emitting from the write pole 202 toward a magnetic media (not shown in FIG. 2). The magnetic write field travels through the magnetic media and back to through the return poles 204, 206. Because write pole 202 has a much smaller cross section at the media facing surface MFS than does either of the return poles 204, 206, the write field from the write pole 202 will be sufficiently strong to write to the media. However, because of the larger cross section of the return poles 204, 206, the magnetic field returning to the return poles 204, 206 will be more spread out and weak so that it does not erase the previously recorded signal.

High data density magnetic recording systems require a magnetic media having a high magnetic coercivity and high magnetic anisotropy in order to ensure stability of the recorded signal. However, this high coercivity and high anisotropy also make the magnetic media difficult to write to, especially when recording a very small magnetic bit using a very small magnetic write pole 202. In order to facilitate recoding to such a media, the write head 200 can include a magnetic microwave oscillator such as a spin torque oscillator 216. This magnetic oscillator 216 generates an oscillating magnetic field that magnetically excites the adjacent magnetic media (not shown in FIG. 2), making recording to the media easier. A possible structure of the magnetic oscillator 216 and nature of the resulting oscillating magnetic field will be described in greater detail herein below.

As shown in FIG. 2, the magnetic oscillator 216 can be sandwiched between the write pole 202 and a trailing magnetic shield 218. The magnetic trailing shield 218 helps to increase the field gradient of the write field produced by the magnetic write pole 202. In addition, an electrically conductive, non-magnetic bump structure 220 is formed over a portion of the magnetic oscillator 216 between the magnetic oscillator 216 and trailing magnetic shield 218. The presence of the non-magnetic, electrically conductive bump 220 helps to improve performance of the magnetic oscillator 216.

Figure 5:
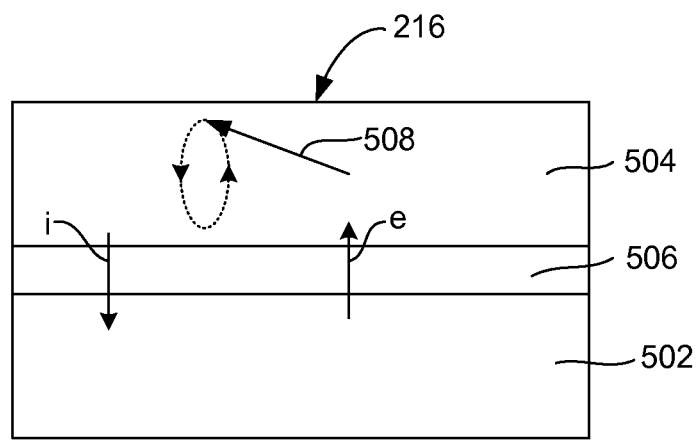
FIG. 5 is a schematic illustration of a spin torque oscillator.

FIG. 5 shows a schematic illustration of an example of a spin torque oscillator 216 for generating oscillating magnetic fields. The magnetic oscillator includes a magnetic spin injection layer 502, a magnetic oscillation layer 504 and an intermediate layer 506 sandwiched between the spin injection layer 502, and magnetic oscillation layer 504. The spin injection layer 502 and magnetic oscillation layer 504 are each constructed of an electrically conductive, magnetic material, whereas the intermediate layer 506 is constructed of a non-magnetic material. In addition, the spin injection layer 502 has a magnetization that is pinned in a desired direction, whereas the magnetic oscillation layer 504 has a magnetization that is free to move. An electrical current can be passed through the spin torque oscillator as indicated by the arrow designated as "i". As shown in FIG. 5, the current flows through the spin torque oscillator in a direction from the magnetic oscillation layer 504 to the spin injection layer 502. As those skilled in the art will recognize, this direction of electrical current flow i results in electrons travelling in an opposite direction from the spin injection layer 502 toward the magnetic oscillation layer 504, as indicated by arrow e. As the electrons travel through the spin injection layer 502, their spins become aligned (in the aggregate) as a result of the pinned magnetization of the spin injection layer 502. These spin oriented electrons then travel through the intermediate layer 506 to the magnetic field generation layer 504. The alignment of the spins of the electron traveling through the magnetic field generation layer causes a spin torque, which results in an oscillating magnetic field indicated by arrow 508. This oscillating magnetic field can oscillate in a precessional manner as shown in FIG. 5.

However, in order for the spin torque oscillator 216 to operate with optimal efficiency, it is desirable that the electrons travel through the intermediate layer 506 in a direction that is as close as possible to perpendicular to the plane of the intermediate layer 506. In the schematic illustration of FIG. 5, this would not be a problem. However, as will be recalled with reference to FIG. 2, the spin torque oscillator 216 is formed at a slant on the tapered trailing surface of the write pole 202. This would tend to cause the electrons to travel at an angle through the spin torque oscillator 216, resulting in reduced performance of the spin torque oscillator 216.

Figure 3:
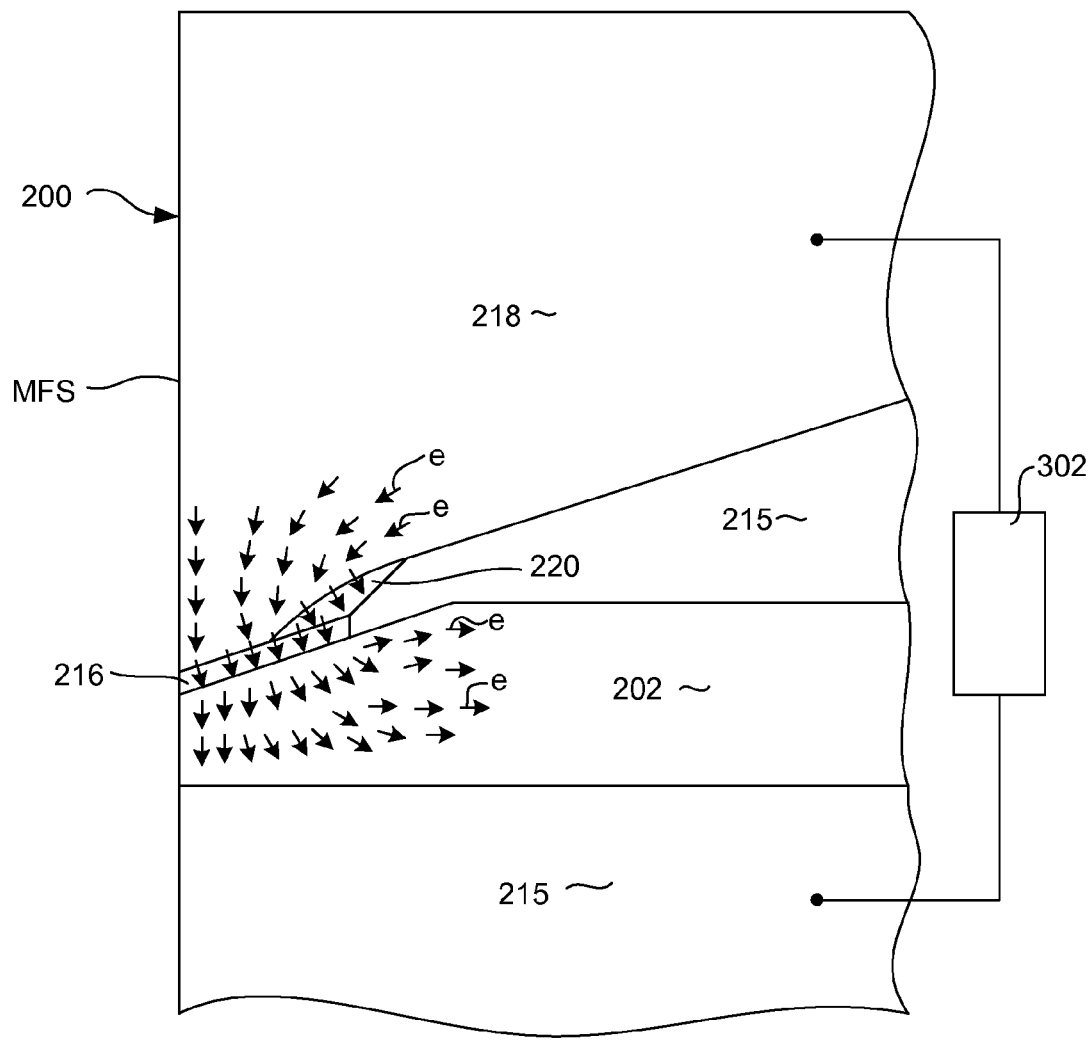
FIG. 3 is an enlarged side, cross sectional view of a write pole tip portion of the magnetic head.
Figure 4:
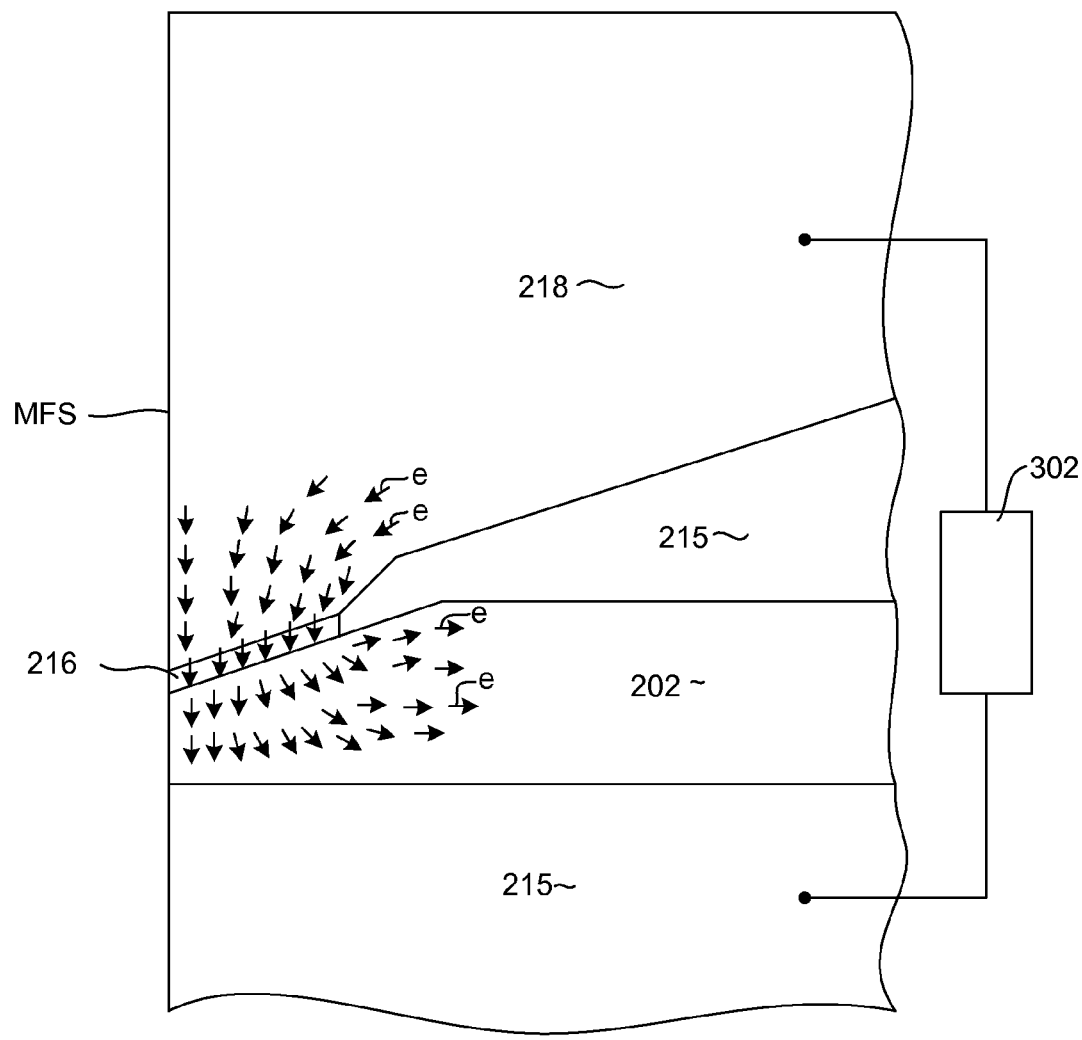
FIG. 4 is an enlarged side, cross sectional view of a write pole tip portion of a magnetic head that does not include a non-magnetic bump structure, shown for comparison purposes.

FIGS. 3 and 4 show enlarged, side cross sectional views of a pole tip region of the write head, and illustrate a write head structure that can cause electrons to travel through the spin torque oscillator 216 in a more perpendicular direction even when it is formed at an inclined angle. FIG. 4 shows a spin torque oscillator 216 that is sandwiched between the write pole 202 and the trailing shield 218, with a non-magnetic, electrically conductive refill layer 215 behind the spin torque oscillator 216. Circuitry 302 is provided to supply an electrical current to the write pole 202 and the trailing shield 218. The electrical current flows between the write pole 202 and trailing shield 218 through the spin torque oscillator 216 in order to activate the spin torque oscillator. The direction of the flow of electrons through the spin torque oscillator spin torque oscillator is indicated by the arrows "e", not all of which have been labeled for purposes of clarity. As can be seen, as a result of the spin torque oscillator being inclined at an angle (which can be 20-30 or about 25 degrees relative to a plane that is perpendicular to the media facing surface MFS), the electrons flow at a corresponding angle through the spin torque oscillator 216, which angle can also be about 25 degrees away from being perpendicular to the plane of the layers of the spin torque oscillator 216. As will be recalled, this angle of electron flow degrades the performance of the spin torque oscillator 216.

However, FIG. 3 illustrates a structure that mitigates this problem, causing the electrons to flow in a direction that is more perpendicular to the plane of the layers of the spin torque oscillator 216. As can be seen, the write head of FIG. 3 is similar to that of FIG. 4, except that it includes a non-magnetic, electrically conductive layer or bump structure 220 located at the back portion of the spin torque oscillator 220 away from the media facing surface MFS. This bump 220 was also shown in FIG. 2. This non-magnetic, electrically conductive bump 220 can be constructed of a material such as Cu and can be formed at the trailing surface of the spin torque oscillator 216, so as to separate a portion of the spin torque oscillator 216 from the trailing magnetic shield 218. The non-magnetic, electrically conductive bump 220 is formed at a back portion of the spin torque oscillator 216, away from the media facing surface MFS, and may extend beyond the spin torque oscillator 216 so that a portion of it is formed over the non-magnetic, electrically insulating refill layer 215 so as to separate a portion of the non-magnetic, electrically insulating refill layer from the trailing magnetic shield 218.

Again, in FIG. 3, the direction of travel of the electrons through the spin torque oscillator 216 is indicated by arrows designated as "e", not all of which have been labeled. As illustrated in FIG. 3, the presence of the non-magnetic, electrically conductive bump 220 causes direction of the electron travel through the bump 220 to change. This results in the electrons traveling through the spin torque oscillator in a direction that is more perpendicular to the plane of the layers of the spin torque oscillator 216.

Figure 6:
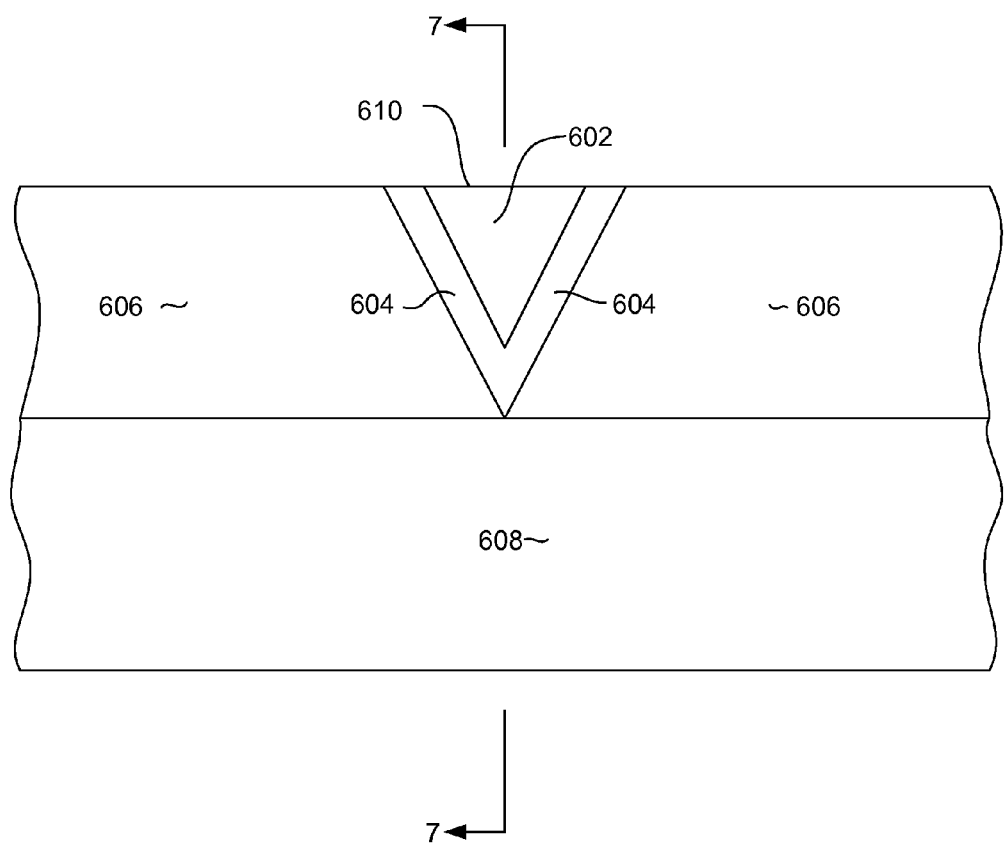
FIGS. 6-16 are views of a portion of a magnetic write head in various intermediate stages of manufacture, illustrating a method for manufacturing a magnetic write head according to an embodiment of the invention.

FIGS. 6 through 16 show a portion of a magnetic write head in various intermediate stages of manufacture, in order to illustrate a method of manufacturing a magnetic write head according to an embodiment of the invention. With particular reference to FIG. 6, a write pole 602 is formed. A non-magnetic side gap layer 604 can be formed at the sides of the write pole 602, and can be constructed of a non-magnetic material such as alumina and/or SiO2. Magnetic side shields 606 can be formed at either side of the write pole 602 and side gap 604. The write pole 202, side gaps 604 and side shields 606 can be formed on a substrate 608 that can include a non-magnetic, electrically insulating fill layer such as alumina, and can also include a magnetic shaping layer, such as the layer 208 of FIG. 2. The write pole 602 can be formed by a damascene method that will be familiar to those skilled in the art and can be formed to have a trapezoidal cross section along a plane parallel with the media facing surface plane or a triangular shape as shown in FIG. 6. The write pole 602 can also be formed to have an exposed upper, or trailing edge 610.

Figure 7:
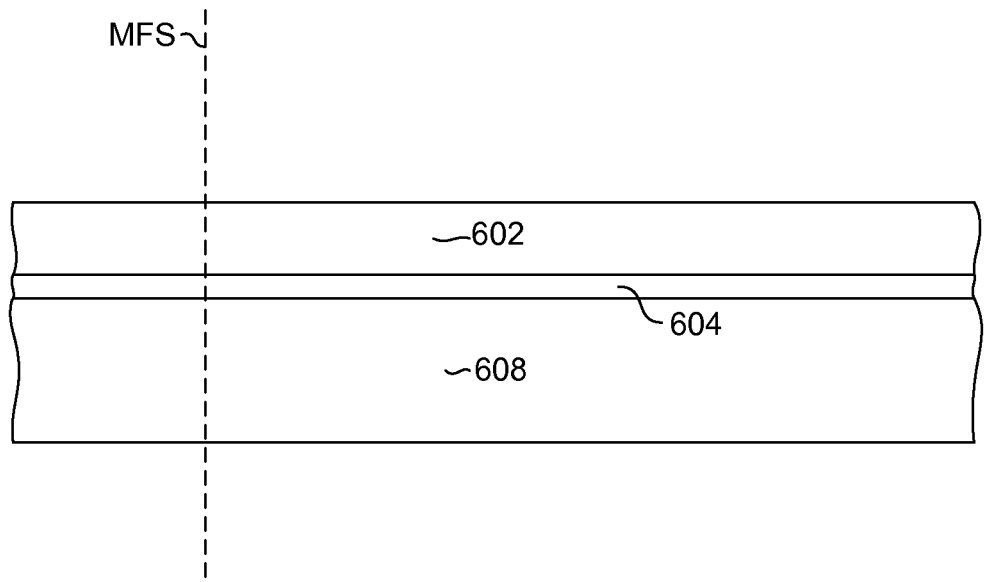

FIG. 7 shows a side cross sectional view of the structure of FIG. 6 as seen from line 7-7 of FIG. 6. The location of the media facing surface plane is indicated by the dashed line denoted as MFS. As those skilled in the art will appreciate, the media facing surface is not actually formed at this point in manufacture, but will be later formed after the head has been constructed on the wafer (not shown) and after the wafer has been sliced into rows and lapped to form the media facing surface.

Figure 8:
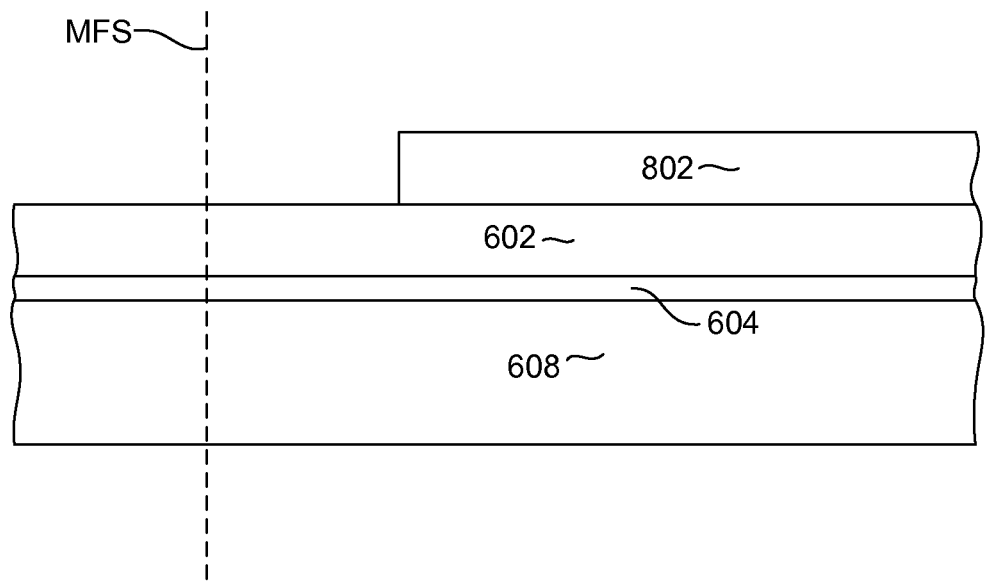

With reference now to FIG. 8, a sacrificial step structure 802 is formed over the write pole 602, with a front edge that is located a desired distance from the media facing surface plane MFS. This step structure 802 is preferably a material that can withstand ion milling, but can be later removed by another process such as a selective reactive ion etching.

Figure 9:
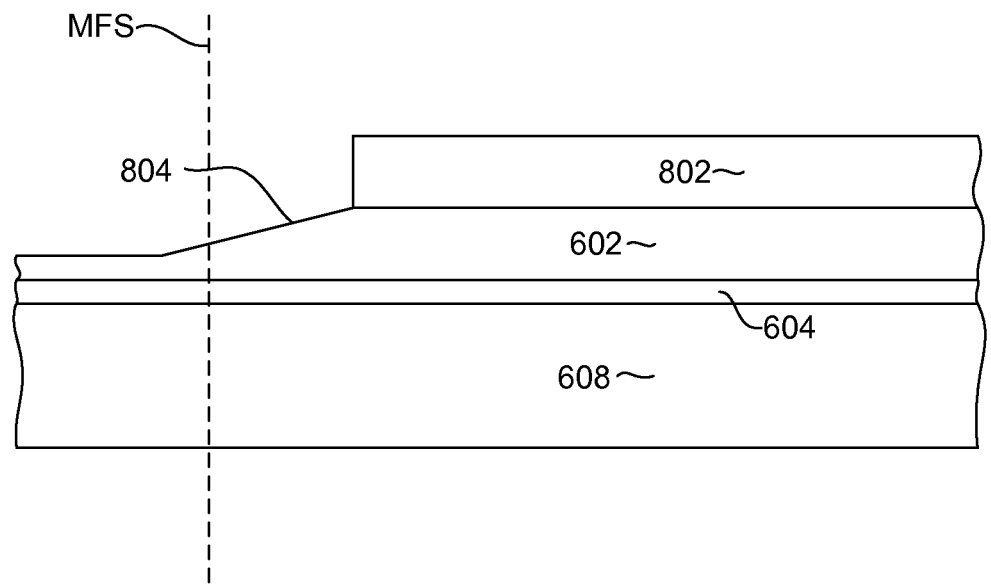

Then, with reference to FIG. 9, an ion milling is performed at an angle relative to normal. With the step 802 in place, the ion milling removes material that is not protected by the step 802. By performing the ion milling at an angle, shadowing from the step structure 802 causes the ion milling to form a tapered or angled surface 804 on the write pole 602. Then, after the taper 804 has been formed, the step structure 802 can be removed, such as by reactive ion etching.

Figure 10:
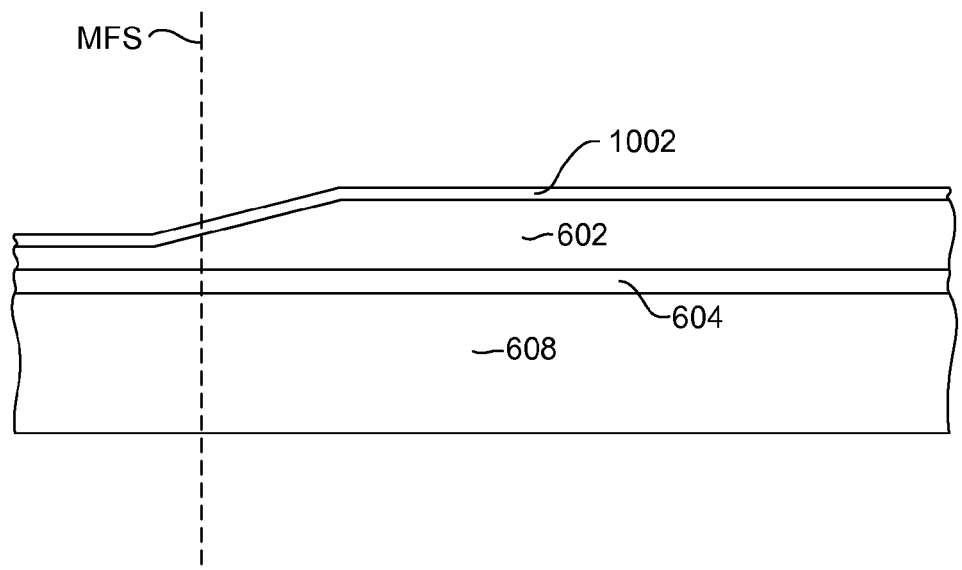

With reference now to FIG. 10, a spin torque oscillator layer 1002 is deposited. While the layer 1002 is shown as a single layer in FIG. 10 for purposes of illustration, it will actually include multiple layers such as a first magnetic layer, a non-magnetic layer formed on the first magnetic layer, and a second magnetic layer formed on the non-magnetic layer. These layers can be deposited so as to form a spin torque oscillator such as the spin torque oscillator 216 described in FIG. 5.

Figure 11:
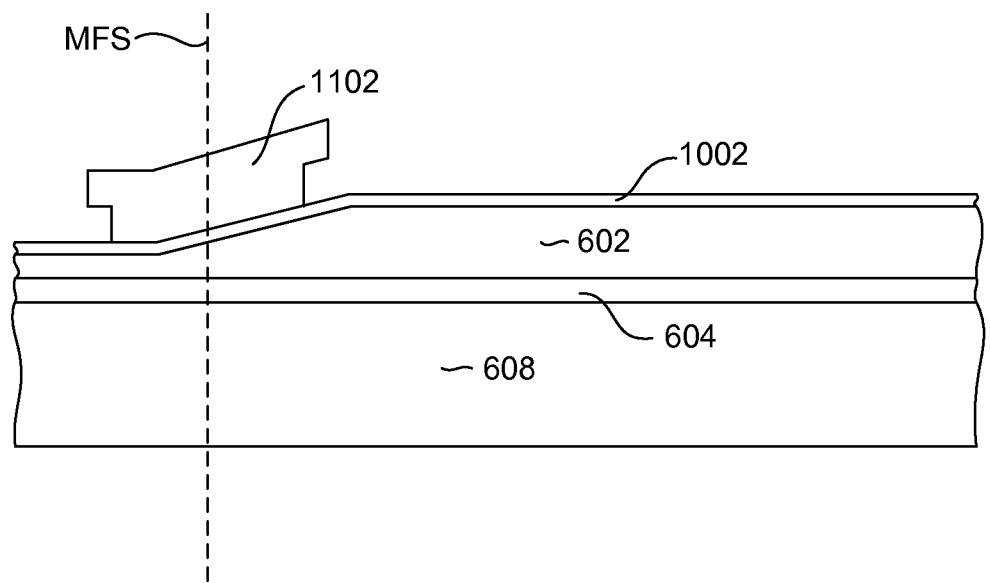

With reference now to FIG. 11, a mask 1102 is formed over the spin torque oscillator material 1002. The mask 1102 is configured to define the shape of the spin torque oscillator, and is preferably formed as a bi-layer mask having an overhanging portion as shown in FIG. 11. This mask configuration will be useful for reasons that will become apparent below.

Figure 12:
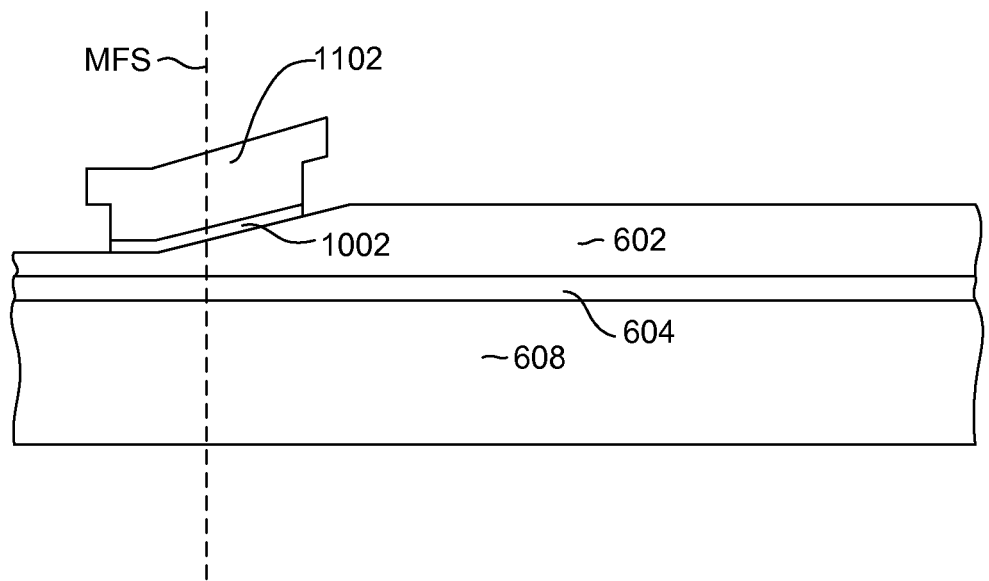
Figure 13:
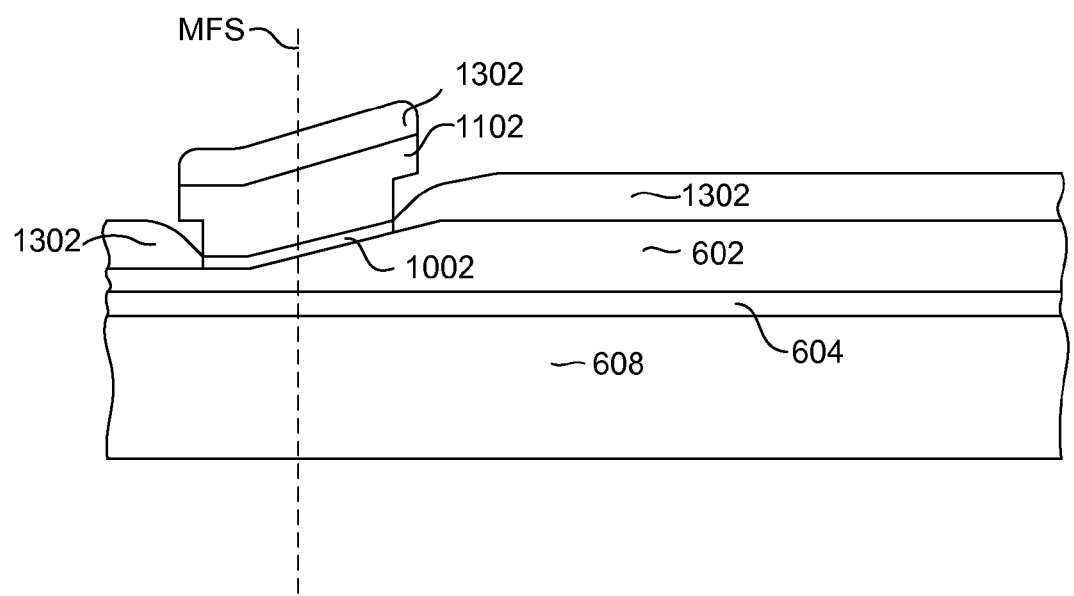

With reference now to FIG. 12, an ion milling is performed to remove portions of the spin torque oscillator material 1002 that are not protected by the mask structure 1102. Then, with reference now to FIG. 13, with the mask 1102 still in place, a layer of non-magnetic, electrically insulating fill material such as alumina 1302 is deposited. After the fill material 1302 has been deposited, the mask 1102 can be lifted off, such as by a chemical liftoff process. As can be seen, the bi-layer structure of the mask 1102 facilitates liftoff by leaving a portion of the mask exposed after the fill material 1302 has been deposited. The overhanging portion of the mask 1102 allows the chemical liftoff solution to reach the mask 1102 to facilitate mask removal.

Figure 14:
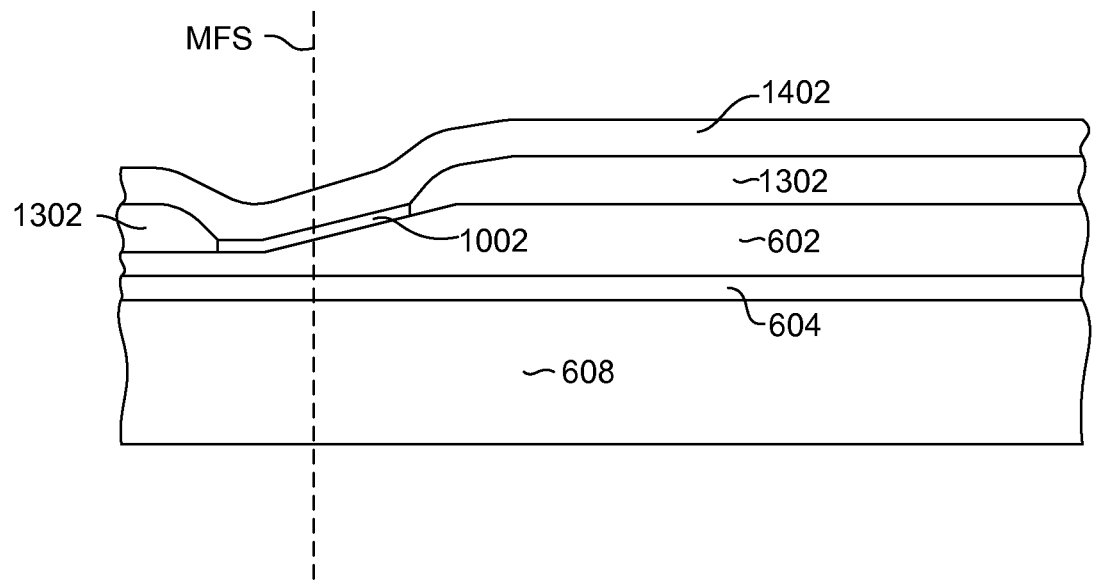
Figure 15:
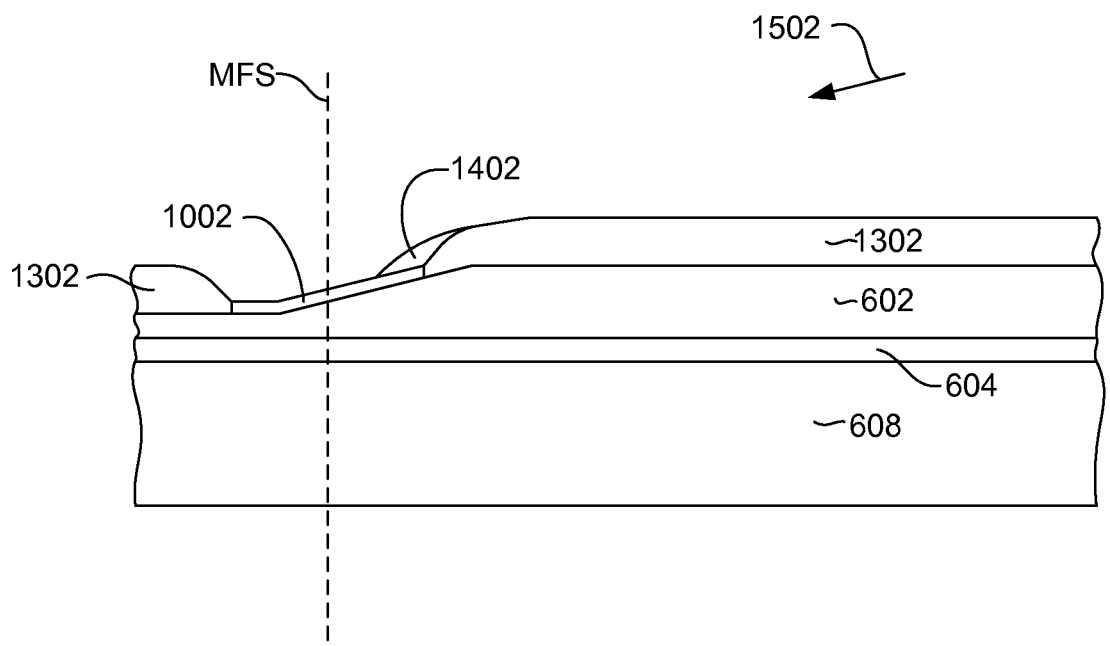

Then, with reference to FIG. 14, a non-magnetic, electrically conductive material such as Cu or some other suitable material is deposited over the spin torque oscillator 1002 and fill layer 1302. Then, with reference to FIG. 15 an ion milling is performed to remove most of the non-magnetic, electrically conductive material 1402. The ion milling is performed at a glancing angle (high angle relative to normal) as indicated by arrow 1502. This glancing angle of the ion milling allows the ion milling to remove most of the non-magnetic, electrically conductive material 1402, while leaving an electrically conductive, non-magnetic bump 1402 located only at the back portion of the spin torque oscillator 1002.

Figure 16:
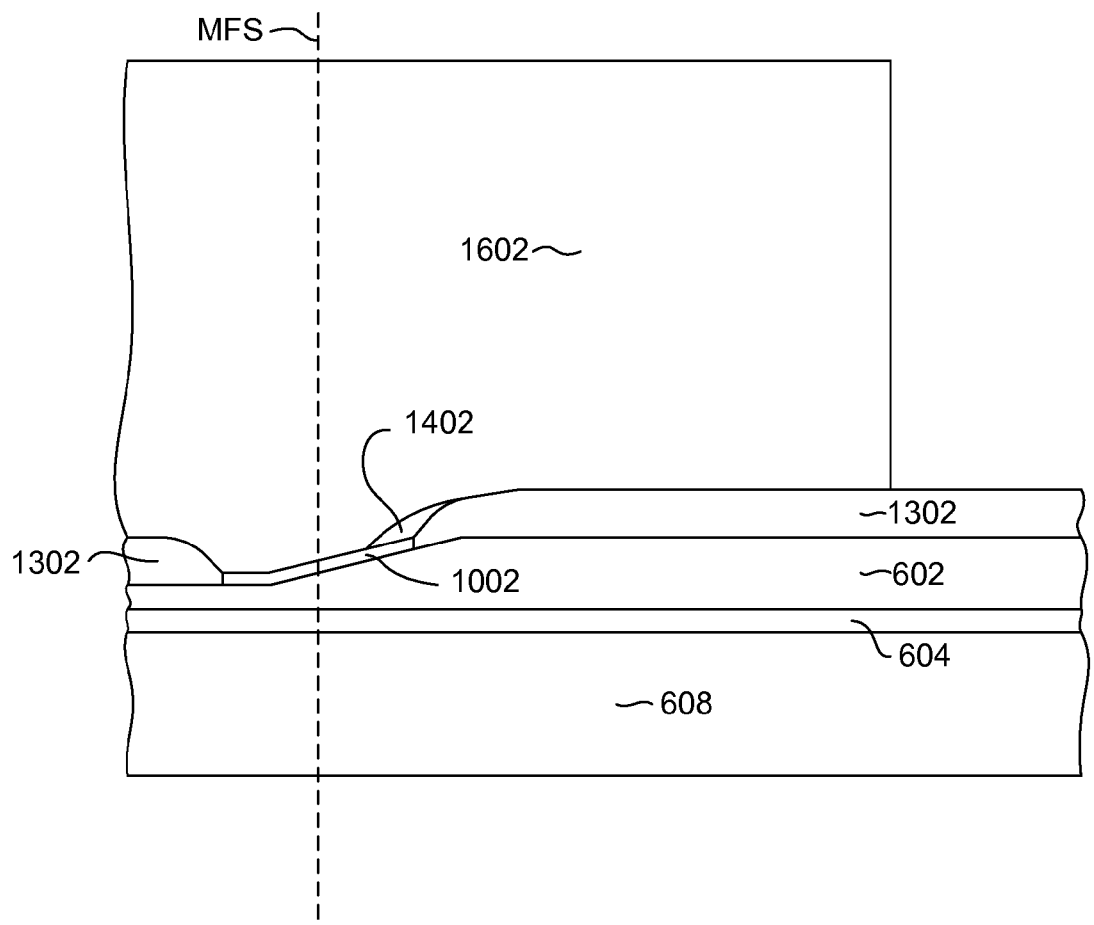

Then, as shown in FIG. 16, a trailing, magnetic shield 1602 can be formed over the spin torque oscillator, non-magnetic, electrically conductive bump 1502 and fill layer 1302. The trailing, magnetic shield 1602 can be formed by a process such as electroplating using an appropriate mask for defining the shape of the shield 1602.

While various embodiments have been described above, it should be understood that they have been presented by way of example only and not limitation. Other embodiments falling within the scope of the invention may also become apparent to those skilled in the art. For example, while above described embodiments have been described in terms of use in a disk drive system, they could also be applied to a magnetic tape drive system. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic write head, comprising:
   a magnetic write pole extending to a media facing surface and having a tapered trailing edge;
   a magnetic oscillator structure formed on the tapered trailing edge of the magnetic write pole;
   a non-magnetic, electrically conductive layer formed on a portion of the magnetic oscillator that is removed from the media facing surface; and
   a magnetic shield formed over the magnetic oscillator structure and non-magnetic, electrically conductive layer;
   wherein at least a portion of the non-magnetic, electrically conductive layer is located between the magnetic oscillator structure and the magnetic shield.

2. The magnetic write head as in claim 1 wherein the non-magnetic, electrically conductive layer is in the form of a bump.

3. The magnetic write head as in claim 1 wherein the magnetic oscillator has a back edge that is removed from the media facing surface, the write head further comprising a non-magnetic, electrically insulating refill layer extending from the back edge of the magnetic oscillator structure in a direction away from the media facing surface.

4. The magnetic write head as in claim 3 wherein the non-magnetic, electrically conductive layer extends over a portion of the non-magnetic, electrically insulating fill layer.

5. The magnetic write head as in claim 1 wherein the non-magnetic, electrically conductive layer comprises Cu.

6. The magnetic write head as in claim 3 wherein the non-magnetic, electrically insulating fill layer comprises alumina.

7. The magnetic write head as in claim 1 wherein the tapered trailing edge of the write pole defines an angle of about 25 degrees relative to a plane that is perpendicular to the media facing surface.

8. The magnetic write head as in claim 1 wherein the tapered trailing edge of the write pole defines an angle of 20-30 degrees relative to a plane that is perpendicular to the media facing surface.

9. The magnetic write head as in claim 1 further comprising circuitry connected with the write pole and the magnetic shield for supplying an electrical current through the magnetic oscillator.

10. The magnetic write head as in claim 8 wherein the presence of the non-magnetic, electrically conductive layer causes electrons to flow through the magnetic oscillator in a direction that is substantially perpendicular to the magnetic oscillator.

11. The magnetic write head as in claim 1 wherein the magnetic oscillator is a spin torque oscillator.

12. The magnetic write head as in claim 1 wherein magnetic oscillator further comprises a magnetic spin injection layer having a pinned magnetization, a magnetic oscillation layer having an unpinned magnetization, and a non-magnetic inter-layer disposed between the magnetic spin injection layer and the magnetic oscillation layer.

13. A magnetic data recording system, comprising:
    a housing;
    a magnetic media moveably held within the housing;
    a slider;
    an actuator for moving the slider adjacent to the magnetic media; and
    a write head formed on the slider, the write head further comprising:
    a magnetic write pole extending to a media facing surface and having a tapered trailing edge;
    a magnetic oscillator structure formed on the tapered trailing edge of the magnetic write pole;
    a non-magnetic, electrically conductive layer formed on a portion of the magnetic oscillator that is removed from the media facing surface; and
    a magnetic shield formed over the magnetic oscillator structure and non-magnetic, electrically conductive layer wherein
    at least a portion of the non-magnetic, electrically conductive layer is located between the magnetic oscillator structure and the magnetic shield.

14. The magnetic data recording system as in claim 13, wherein the non-magnetic, electrically conductive layer is in the form of a bump.

15. The magnetic data recording system as in claim 14, wherein the magnetic oscillator has a back edge that is removed from the media facing surface, the write head further comprising a non-magnetic, electrically insulating refill layer extending from the back edge of the magnetic oscillator structure in a direction away from the media facing surface.

16. The magnetic data recording system as in claim 15, wherein the non-magnetic, electrically conductive layer extends over a portion of the non-magnetic, electrically insulating fill layer.

17. The magnetic data recording system as in claim 13, wherein the non-magnetic, electrically conductive layer comprises Cu.

18. The magnetic data recording system as in claim 15, wherein the non-magnetic, electrically insulating fill layer comprises alumina.

19. The magnetic data recording system as in claim 13, wherein the tapered trailing edge of the write pole defines an angle of about 25 degrees relative to a plane that is perpendicular to the media facing surface.

20. The magnetic data recording system as in claim 13, wherein the tapered trailing edge of the write pole defines an angle of 20 to 30 degrees relative to a plane that is perpendicular to the media facing surface.

* * * * *